(12) United States Patent
Wood

(10) Patent No.: US 9,078,013 B2
(45) Date of Patent: Jul. 7, 2015

(54) CONTENT VERIFICATION USING LUMINANCE MAPPING

(71) Applicant: Verizon Patent and Licensing Inc., Basking Ridge, NJ (US)

(72) Inventor: Steven Wood, North Waltham, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 85 days.

(21) Appl. No.: 13/930,996

(22) Filed: Jun. 28, 2013

(65) Prior Publication Data

US 2015/0007217 A1    Jan. 1, 2015

(51) Int. Cl.
  *H04N 7/10*      (2006.01)
  *H04N 21/234*    (2011.01)
  *H04N 21/81*     (2011.01)
  *H04N 21/44*     (2011.01)

(52) U.S. Cl.
  CPC ..... *H04N 21/23418* (2013.01); *H04N 21/8146* (2013.01); *H04N 21/44008* (2013.01)

(58) Field of Classification Search
  None
  See application file for complete search history.

(56) References Cited

U.S. PATENT DOCUMENTS

| | | | |
|---|---|---|---|
| 7,043,080 B1 * | 5/2006 | Dolan | 382/199 |
| 2007/0261075 A1 * | 11/2007 | Glasberg et al. | 725/22 |
| 2013/0011071 A1 * | 1/2013 | Deng et al. | 382/195 |
| 2013/0145395 A1 * | 6/2013 | Jeong et al. | 725/40 |
| 2014/0270504 A1 * | 9/2014 | Baum et al. | 382/165 |

* cited by examiner

*Primary Examiner* — Jefferey Harold
*Assistant Examiner* — Samira Monshi

(57) ABSTRACT

A device may obtain a program that includes a logo that is inserted into the program by adding luminance to a set of pixels defining a shape of the logo. The device may generate a luminance map for the program that identifies an amount of luminance added to each pixel included in the set of pixels to insert the logo into the program. The device may determine a selection of the program by a user via a set top box. The device may determine that the set top box is providing the program for display to the user based on the luminance map.

20 Claims, 15 Drawing Sheets

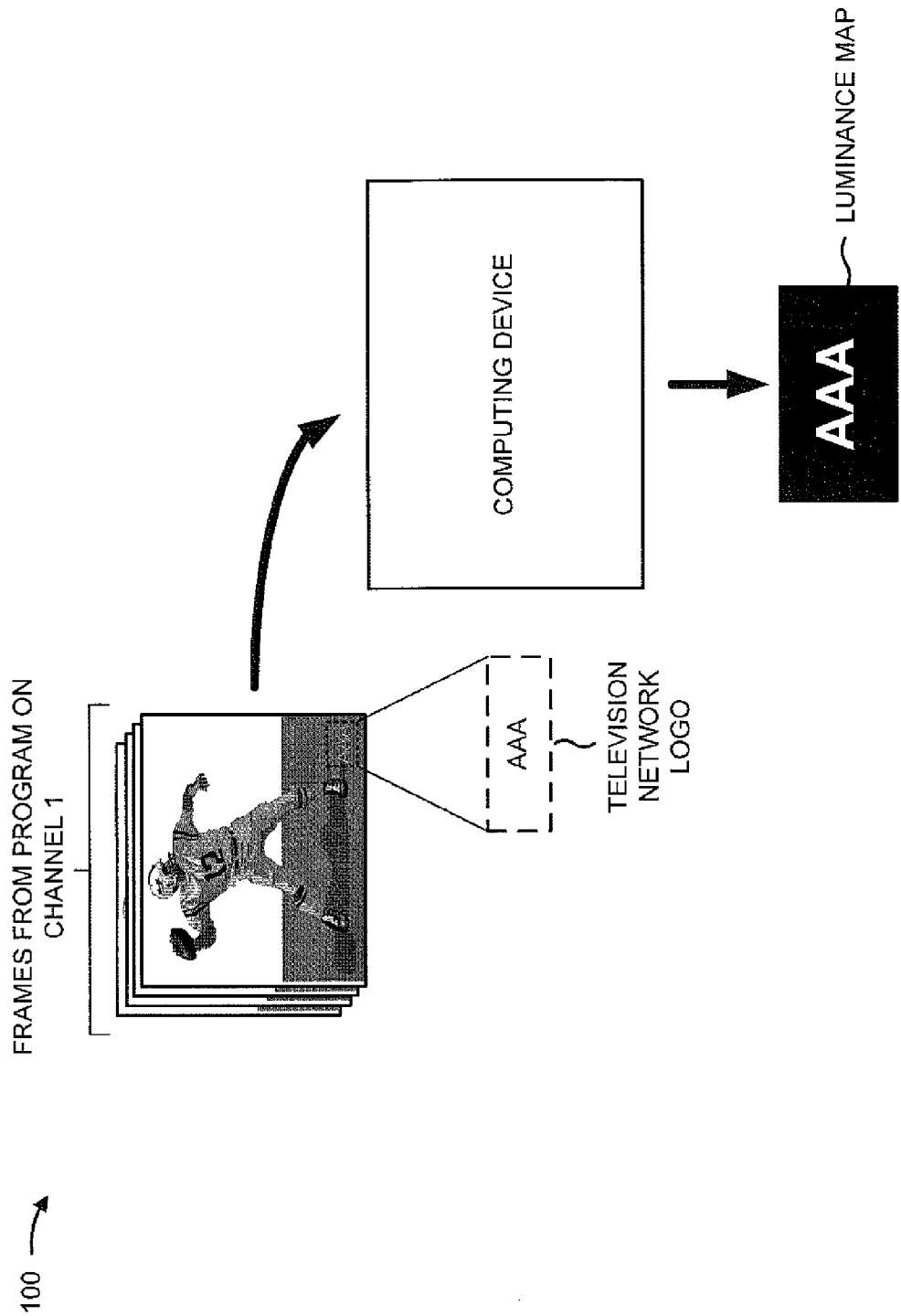

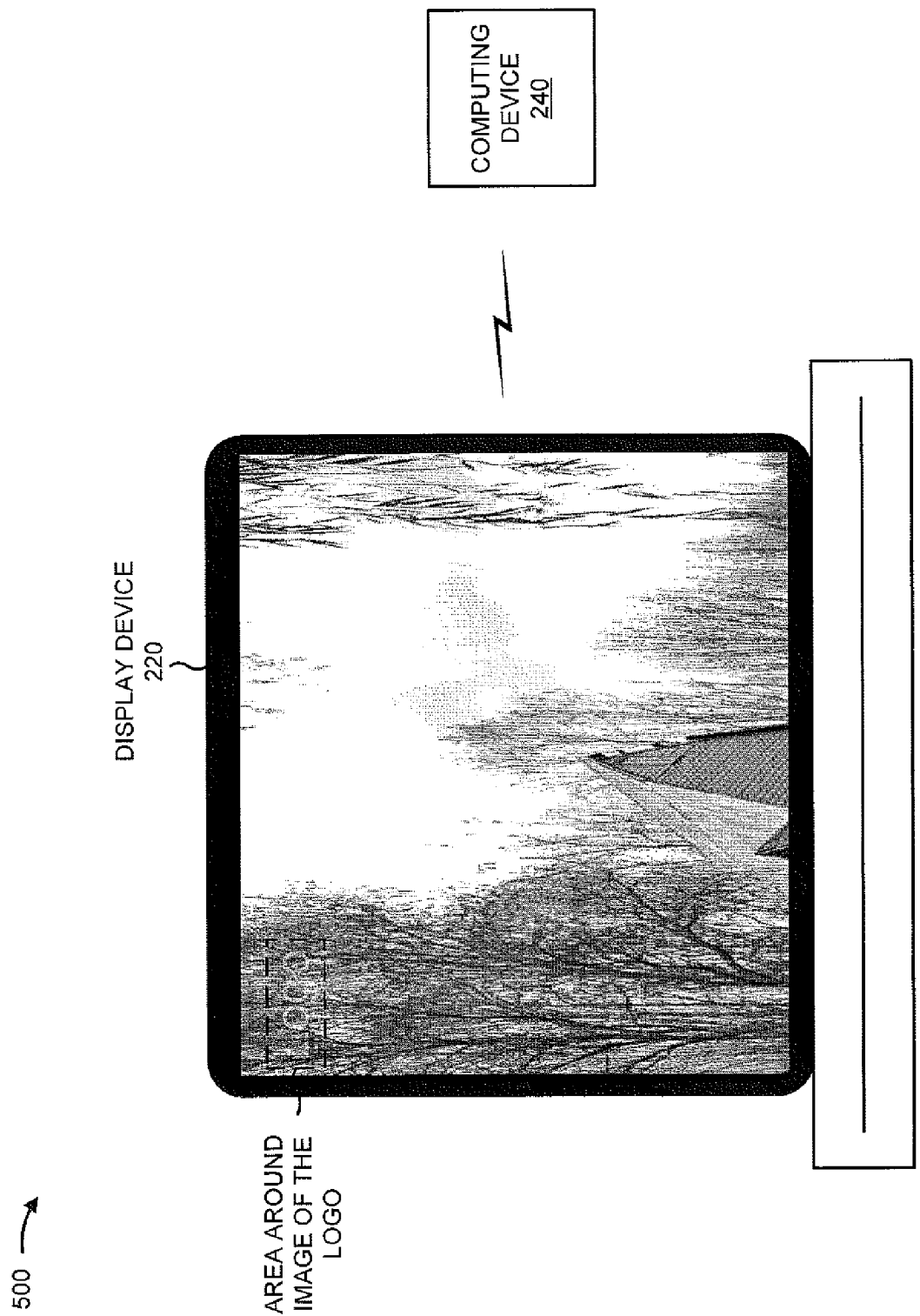

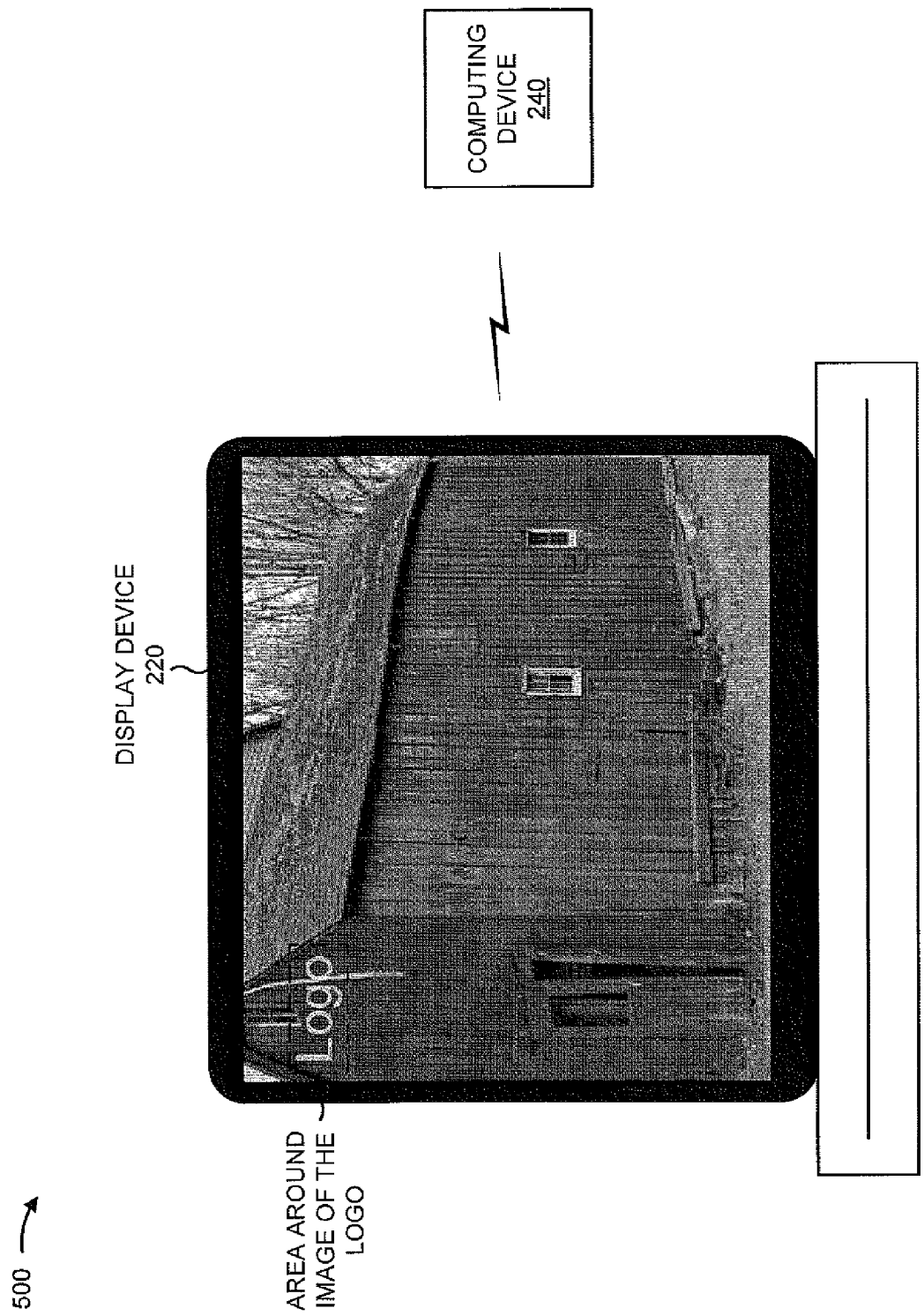

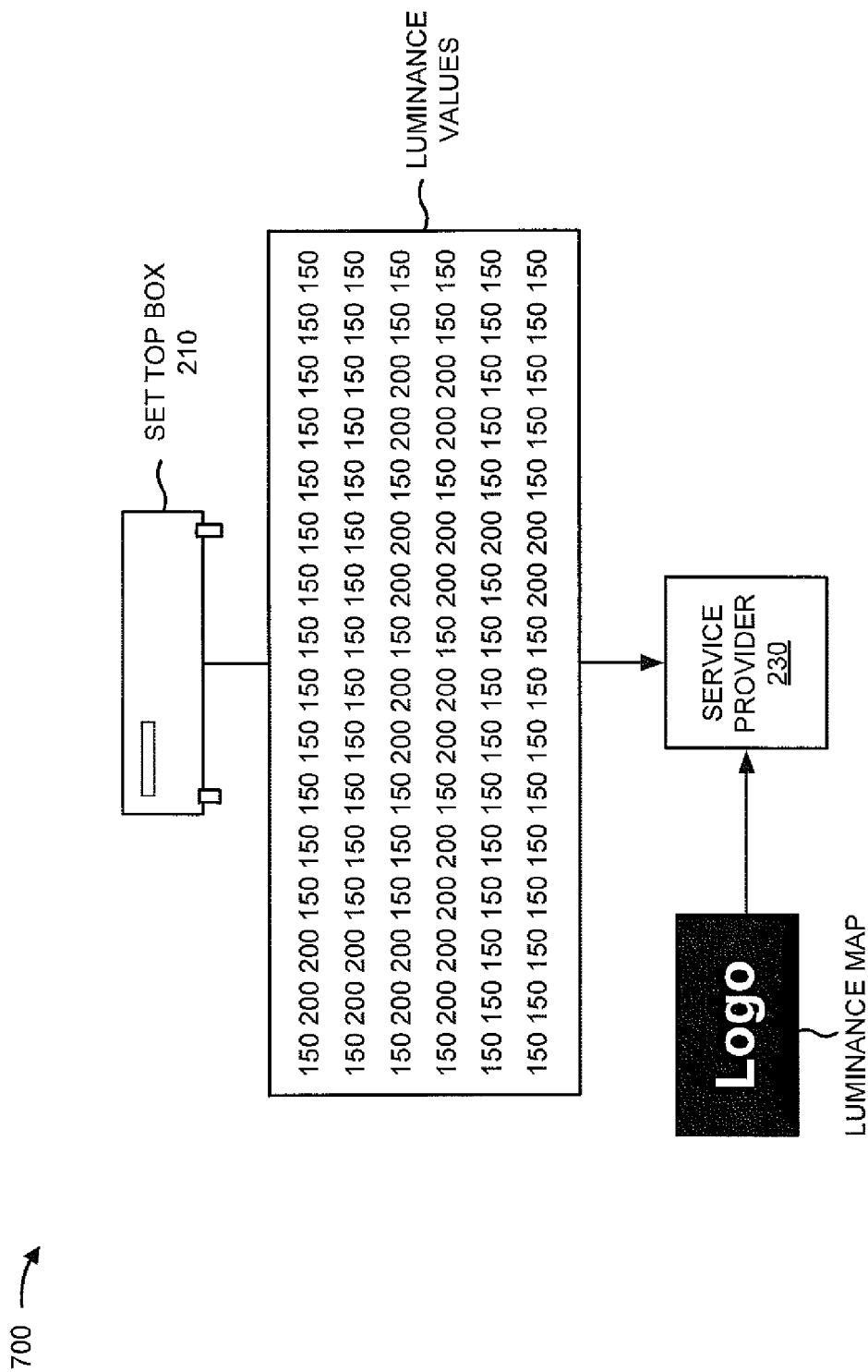

CONTENT VERIFICATION USING LUMINANCE MAPPING

BACKGROUND

Commonly, television networks insert a logo of the network into programs they provide. The logo may be a transparent image displayed over a portion of the program when the program is provided for display.

BRIEF DESCRIPTION OF THE DRAWINGS

FIGS. 1A and 1B are diagrams illustrating an overview of an example implementation described herein;

FIGS. 5A-5F are diagrams illustrating an example of the process described with respect to FIG. 4;

FIGS. 7A-7C are diagrams illustrating an example of the process described with respect to FIG. 6.

DETAILED DESCRIPTION OF PREFERRED EMBODIMENTS

The following detailed description refers to the accompanying drawings. The same reference numbers in different drawings may identify the same or similar elements.

A service provider may provide a variety of program content, such as, for example, television shows, movies, etc., to a user via a set top box. To verify that a set top box is providing the correct program for display to a user, the service provider may verify that the set top box is set to a channel and/or tuned to a frequency that corresponds to a channel selected by the user.

However, even if the set top box is set to the correct channel and/or tuned to the correct frequency, the service provider may not be able to verify that the set top box is actually providing the correct program content for display to the user. For example, the user may access an electronic program guide and may select a particular program that is incorrectly listed in the electronic program guide, a content server providing program content to the set top box may be configured incorrectly and may not be providing the correct program content, and/or there may not be any program content being provided for display despite the diagnostic information indicating that program content is being provided to the display device.

Systems and/or methods described herein may use a luminance map of a logo that is inserted into program content (e.g., a television show, a movie, etc.) to verify that a set top box is actually providing program content, selected by a user, for display to the user.

Figure 1B:
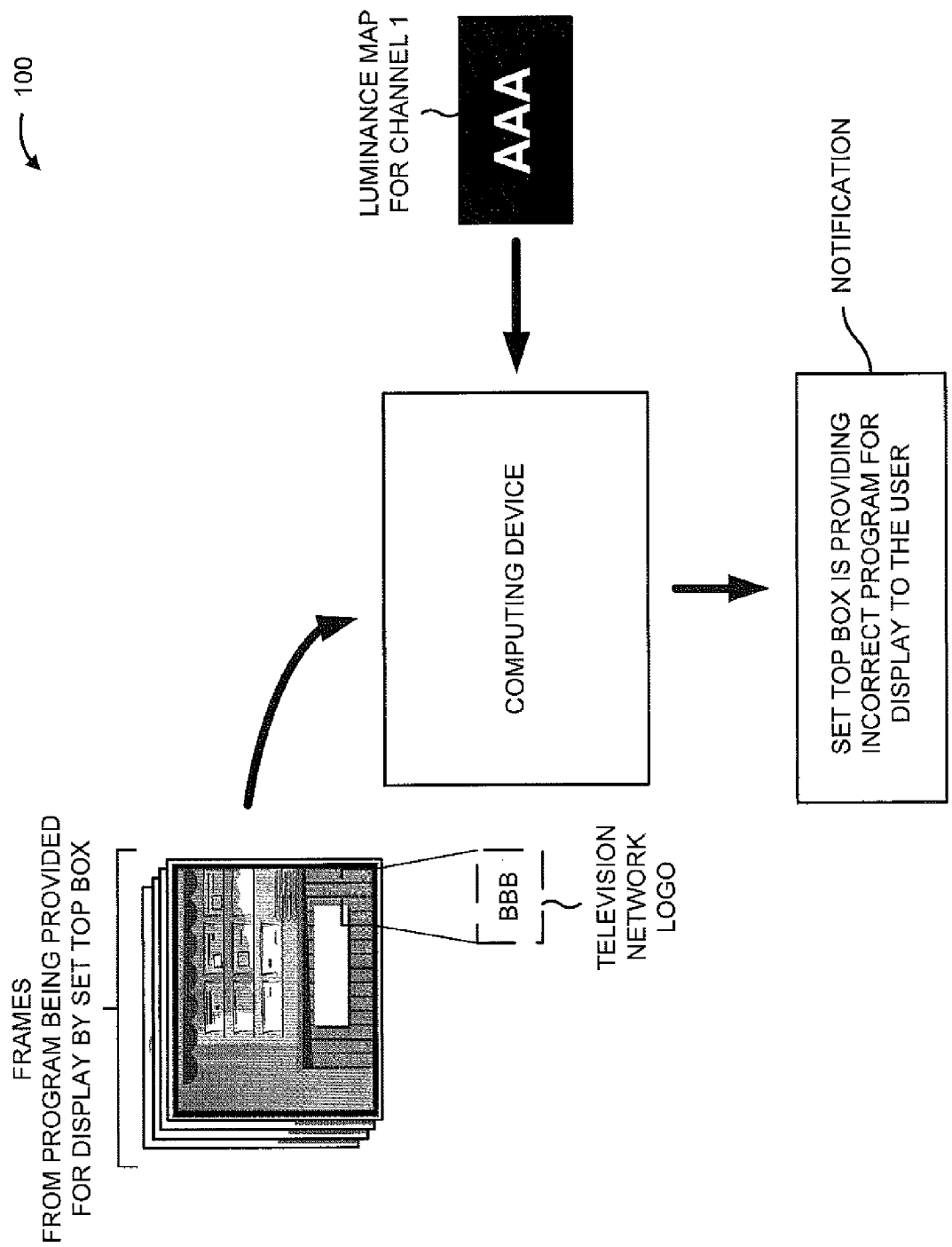

FIGS. 1A and 1B are diagrams illustrating an overview 100 of an example implementation described herein. For overview 100, assume that a service provider desires to verify that a set top box is operating correctly. Further, assume that the service provider determines that a user has selected a program being provided on channel 1 via an electronic program guide provided by the set top box. Referring to FIG. 1A, the service provider may obtain frames from the program being provided on channel 1 from a content server and may provide the frames to a computing device. The frames may include an image of a logo of a television network associated with the program (shown in FIG. 1A as "AAA") that was inserted into the frames by adding luminance to a set of pixels. The computing device may receive the frames and may process the frames at some point in time, to generate a luminance map of the image of the logo.

For FIG. 1B, assume that the user has caused the set top box to tune to channel 1, the set top box is not operating correctly, has tuned to an incorrect channel, and is providing a different program for display to the user as a result of being tuned to the incorrect channel. Further, assume that the service provider obtains frames from the different program from the set top box. Referring now to FIG. 1B, the service provider may provide the frames from the different program to the computing device. The computing device may process the frames from the different program using the luminance map to determine whether the frames from the different program include the image of the logo of the television network associated with the program being provided on channel 1. As shown in FIG. 1B, the computing device determines that the frames from the different program do not include the image of the logo of the television network and outputs a notification indicating that the set top box is not providing the correct program for display to the user.

While the systems and/or methods are described as a service provider generating a luminance map for a program and using the luminance map to verify that the correct program is being provided for display by a set top box, in practice, the systems and/or methods are not so limited. For example, another device, such as, for example, a set top box, may generate a luminance map for a program and/or use the luminance map to verify that the correct program is being provided for display by the set top box. In some implementations, the other device may receive the luminance map from the service provider and may use the luminance map to verify that the correct program is being provided for display by the set top box.

Figure 2:
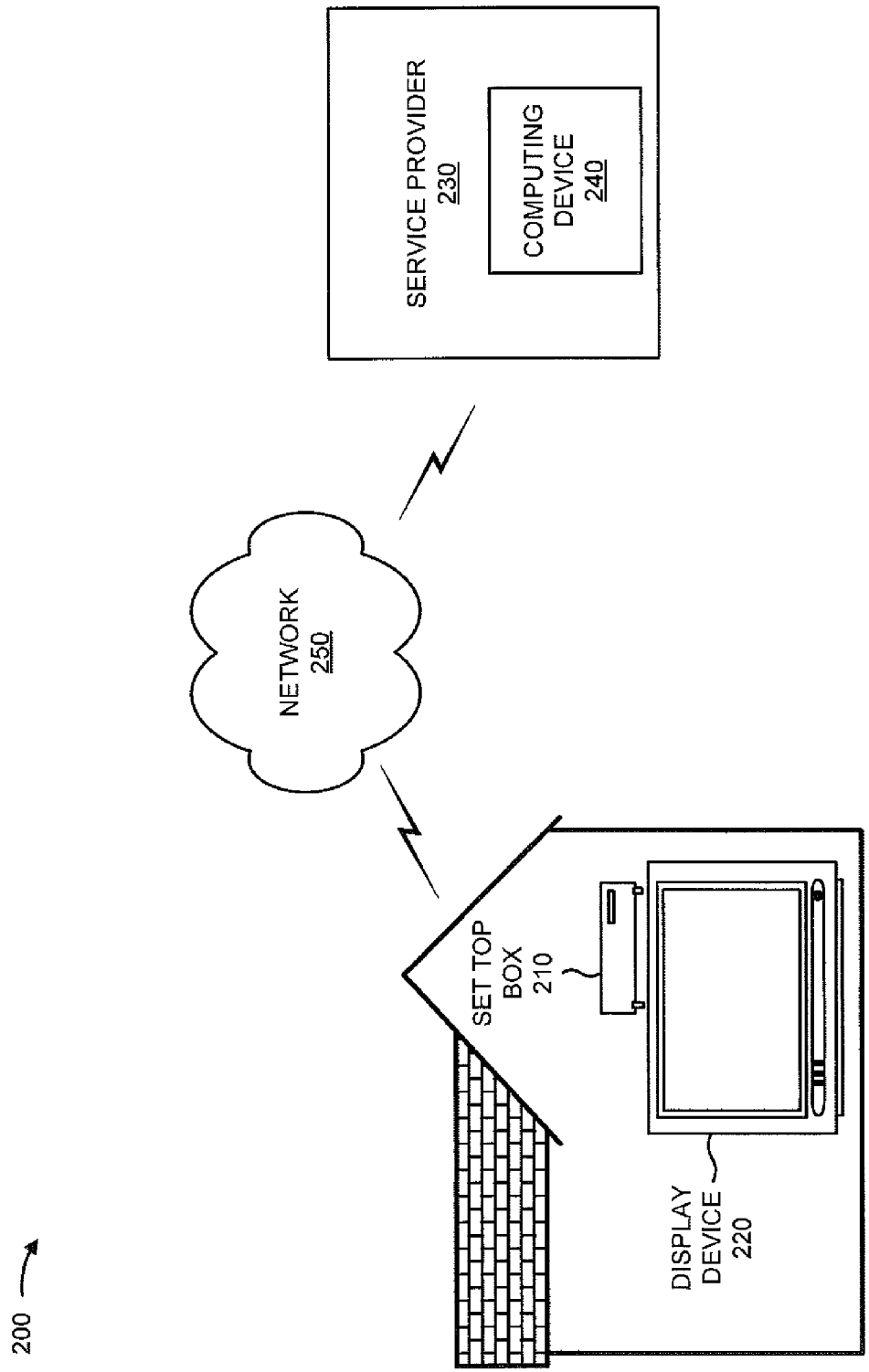
FIG. 2 is a diagram of an environment in which systems and/or methods, described herein, may be implemented.

FIG. 2 is a diagram of an environment 200 in which systems and/or methods described herein may be implemented. As shown in FIG. 2, environment 200 may include set top box 210, display device 220, service provider 230, and computing device 240 interconnected by network 250. Devices of environment 200 may interconnect via wired connections, wireless connections, or a combination of wired and wireless connections.

Set top box 210 may include a device capable of receiving, transmitting, and/or processing multimedia content and providing the multimedia content to a user (e.g., via display device 220). Set top box 210 may allow a user to provide input for interactive menus (e.g., to navigate menu displays or input data) and to alter programming and/or content provided by set top box 210 to display device 220 based on a signal (e.g., a channel up or channel down signal) from, for example, a remote control (not shown).

Display device 220 may include any digital or analog display that is capable of presenting audio and/or video content provided by set top box 210. Display device 220 may include technologies, such as cathode ray tube (CRT) displays, liquid crystal displays (LCDs), light-emitting diode (LED) displays, plasma displays, etc. In some implementations, set top box 210 may be incorporated into display device 220. Examples of display device 220 may include a television, a computer monitor, and/or other types of devices capable of presenting audio and/or video content.

Service provider 230 may include one or more server devices that provide a service for providing programs to set top box 210. For example, service provider 230 may include a headend device that provides broadcast television programs and/or pay-per-view (PPV) events, a video-on-demand (VOD) device or another device that provides programs upon request, and/or a program guide information server that provides information related to programs available to set top box 210.

Computing device 240 may include a device that is capable of generating a luminance map of an image of a logo inserted into a program (e.g., a television show, a movie, etc.) by a provider of the program and/or using the luminance map to verify that set top box 210 is operating correctly (e.g., providing the correct program for display in response to a selection of the program by a subscriber of the service). In some implementations, computing device 240 may be provided within service provider 230. Alternatively, or additionally, computing device 240 may be provided within another device (e.g., set top box 210) that is accessible by service provider 230.

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Although FIG. 2 shows example components of environment 200, in some implementations, environment 200 may include fewer components, different components, differently arranged components, and/or additional components than those depicted in FIG. 2.

Figure 3:
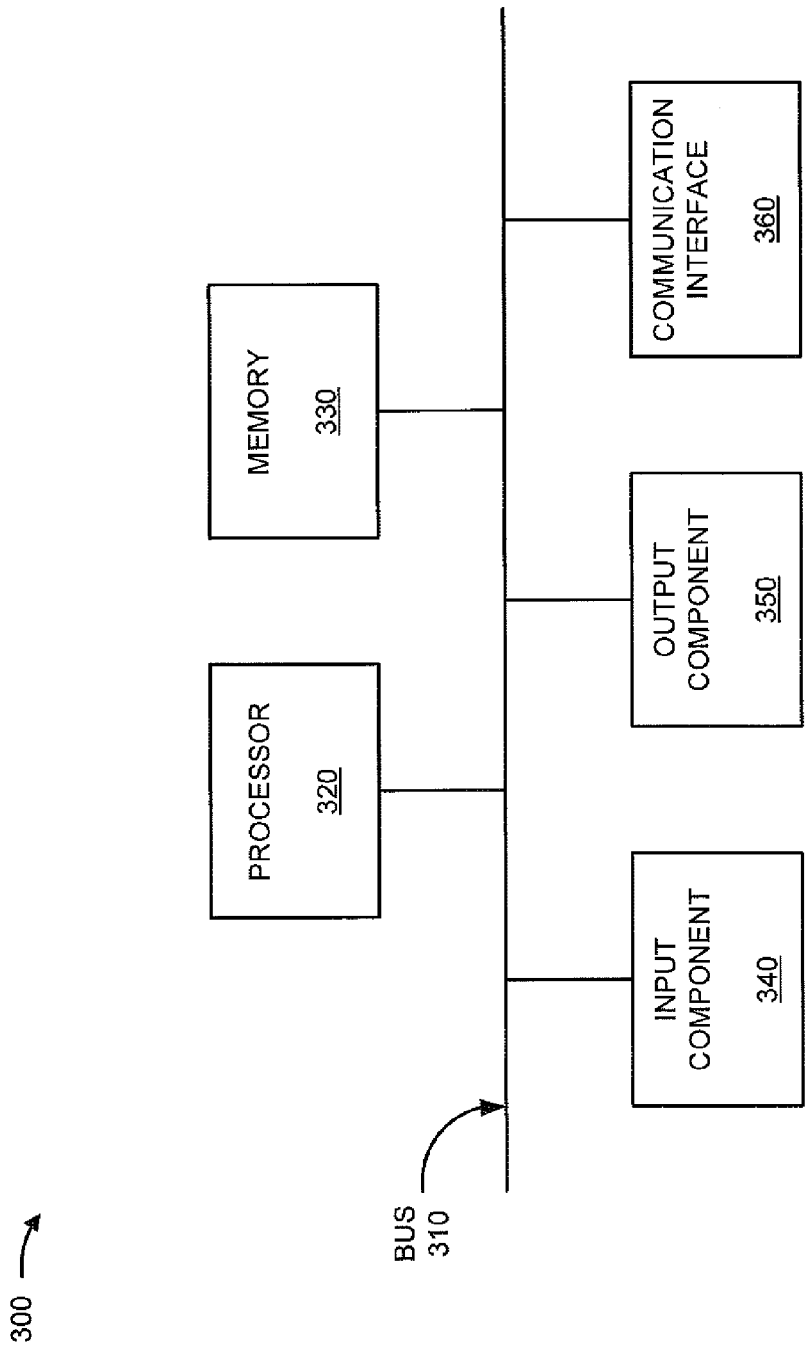
FIG. 3 is a diagram of example components of a device that may be used within the environment of FIG. 2 according to one or more implementations described herein.

FIG. 3 is a diagram of example components of a device 300. Device 300 may correspond to set top box 210, display device 220, service provider 230, and/or computing device 240. Additionally, or alternatively, each of set top box 210, display device 220, service provider 230, and/or computing device 240 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a camera, a microphone, a switch, etc.). Output component 350 may include a component that outputs information from device 300 (e.g., a display, an audio speaker, one or more light-emitting diodes (LEDs), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
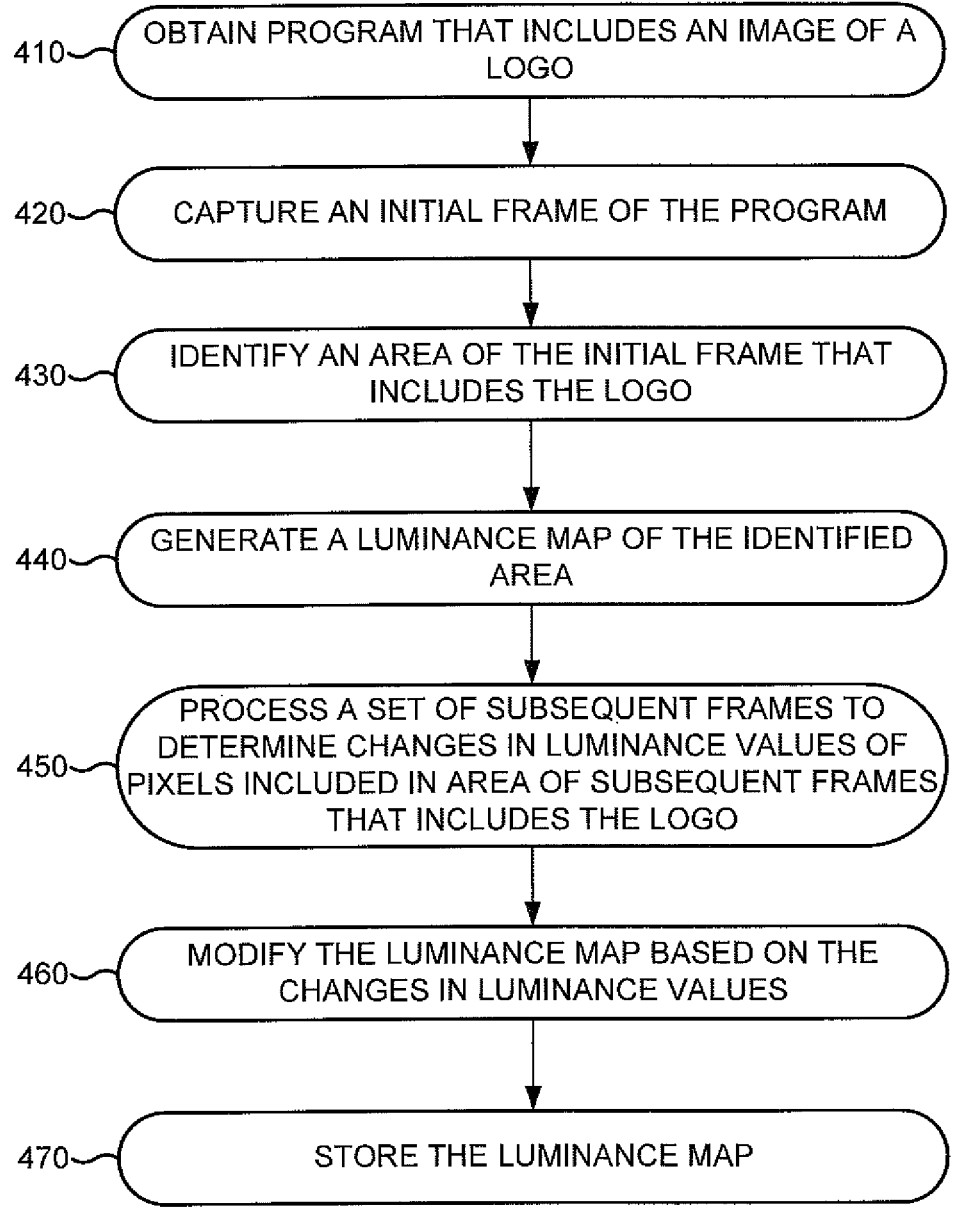
FIG. 4 is a flow chart of an example process for generating a luminance map.

FIG. 4 is a flow chart of an example process 400 for generating a luminance map. In some implementations, process 400 may be performed by computing device 240. In other implementations, one or more blocks of process 400 may be performed by one or more devices instead of, or possibly in conjunction with, computing device 240, such as, for example, set top box 210.

As shown in FIG. 4, process 400 may include obtaining a program that includes an image of a logo (block 410). For example, a content provider may insert an image of a logo into a program (e.g., a television show, a movie, etc.). The image of the logo may appear as a transparent image displayed over the program when the program is displayed by display device 220. The image of the logo may be inserted into the program by adding luminance to (e.g., increasing a luminance value) a set of pixels included within the image of the logo. The content provider may include a content server that stores the program including the inserted image of the logo. Service provider 230 may access the content server and may provide the program to computing device 240.

In some implementations, computing device 240 may receive the program from set top box 210. For example, service provider 230 may include a set top box 210 located at a premises of service provider 230 (e.g., a testing facility). A user (e.g., a technician) may cause set top box 210 to tune to a particular channel (e.g., using a remote control, a probe such as, for example, an infra-red (IR) blaster, etc.) and set top box 210 may receive a video stream transmitted via the particular channel. Set top box 210 may process the video stream to obtain the program in a format that can be displayed via a display device (e.g., display device 220) associated with computing device 240 and may provide the program to computing device 240.

Process 400 may include capturing an initial frame of the program (block 420). For example, computing device 240 may receive the program from set top box 210 and may provide the program for display via the display device. In some implementations, in response to receiving the program, computing device 240 may execute an application for generating a luminance map of the image of the logo included in the program. For example, computing device 240 may execute a media player application that allows the user to view and/or record video content. Computing device 240 may provide, via the application, the program for display via a first window displayed on the monitor. Computing device 240 may capture an initial frame of the program as the program is being displayed via the first window.

In some implementations, the initial frame may be a first frame of the program. In some implementations, the initial frame may be a frame that is being displayed in the first window when a command to capture the initial frame is received. For example, the user may view the program as the program is displayed in the first window. The user may identify a portion of the program in which the logo is visibly displayed (e.g., a scene of the program containing darker images that allow the logo to be easily viewed by the user). The user may provide a command for capturing a frame of the program currently being displayed (e.g., use a mouse and/or a keyboard to select a menu option, provided by the application, for capturing a frame of the program) and computing device 240 may capture a frame of the program currently being displayed via the display device.

In some implementations, the initial frame may be a frame having a particular percentage of pixels having luminance values less than a threshold luminance value. For example, computing device 240 may monitor luminance values of pixels as the program is displayed. Computing device 240 may identify a frame having a particular percentage of pixels with luminance values that are less than a threshold luminance value. Computing device 240 may determine that the frame includes darker images that allow the logo to be visibly displayed based on the frame having the particular percentage of pixels having luminance values that are less than the threshold luminance value. Computing device 240 may capture the identified frame as the initial frame.

Process 400 may include identifying an area of the initial frame that includes the logo (block 430). For example, computing device 240 may cause the initial frame to be displayed via the display device. In some implementations, computing device 240 (e.g., the application for generating the luminance map) may cause the initial frame to be displayed in a second window. The initial frame may include the logo and computing device 240 may determine a set of pixels included in an area of the initial frame that includes the logo.

In some implementations, computing device 240 may identify the area based on an input provided by the user. For example, the user may use a mouse and/or another type of input device to identify (e.g., select, highlight, draw a box around, etc.) an area that includes the logo. Computing device 240 may determine a set of pixels included in the identified area.

Additionally, or alternatively, computing device 240 may determine the area of the initial frame that includes the logo another way. For example, computing device 240 may determine a set of locations that are likely to include the logo (e.g., a lower, right corner, a lower, left corner, etc.). Computing device 240 may determine a set of pixels included in one or more of the set of locations that are likely to include the logo.

Process 400 may include generating a luminance map of the identified area (block 440). For example, computing device 240 may determine a Red Green Blue (RGB) color for each pixel included in the set of pixels included in the identified area. Computing device 240 may compute a gray tone value (e.g., a luminance value) for each pixel based on the determined RGB color. The luminance values may indicate an amount of perceived brightness of a color displayed by each pixel. In some implementations, a pixel displaying a white color may have a highest luminance value and a pixel displaying a black color may have a lowest luminance value. For example, the luminance values may correspond to a range of values between 0 and 250. A pixel displaying a white color may have a luminance value of 250 and a pixel displaying a black color may have a luminance value of 0. Computing device 240 may generate a luminance map based on the determined luminance values. The luminance map may identify the luminance value of every pixel in the identified area.

In some implementations, the luminance map may include information identifying a location of the pixels included in the identified area. For example, each pixel may be associated with a particular addressable element of display device 220. The luminance map may include information identifying the particular addressable element associated with each pixel included in the identified area.

In some implementations, computing device 240 may modify one or more of the luminance values determined for the set of pixels included in the identified area. For example, computing device 240 may determine that a luminance value for a pixel is less than a threshold luminance value. Computing device 240 may determine that luminance has not been added to the pixel (e.g., that the pixel is not included within the logo) based on the luminance value being less than the threshold luminance value. Computing device 240 may set the luminance value for the pixel to a minimum luminance value based on the luminance having not been added to the pixel. For example, computing device 240 may set the luminance value to zero.

In some implementations, computing device 240 may generate a matrix of elements corresponding to the set of pixels included in the identified area. For example, the matrix may include an array of elements that form rows and columns (e.g., a two-dimensional grid) corresponding to rows and columns formed by the pixels included in the identified area. For example, the matrix may include an element (1, 1) (e.g., an element located in a first row and a first column of the rows and columns formed by the array of elements included in the matrix) that corresponds to a pixel located in a first row and a first column of the rows and columns formed by the pixels included in the identified area. Computing device 240 may store, in each element, the luminance value determined for a corresponding pixel for the initial frame (e.g., the luminance value of the pixel in the initial frame or the modified luminance value determined for the pixel).

In some implementations, computing device 240 may generate an image based on the luminance values determined for the pixels included in the identified area. For example, computing device 240 may generate an image by setting luminance values of a group of pixels to corresponding values stored in corresponding elements of the matrix. In some implementations, the generated image may be displayed in a third window that is adjacent to the first window and/or the second window.

As an example, assume that the identified area includes 10,000 pixels positioned in a two-dimensional grid having 100 rows and 100 columns. Computing device 240 may generate a 100×100 matrix having 10,000 elements forming 100 columns and 100 rows. An element included in a first row and a first column of the matrix (e.g., element (1, 1)) may be set to a value corresponding to a luminance value determined for a pixel located in a first row and a first column of the two-dimensional grid. Computing device 240 may generate a gray-scale image of the logo by setting luminance values of a set of pixels to values stored in corresponding elements of the matrix.

Process 400 may include processing a set of subsequent frames to determine changes in luminance values of pixels included in an area of the subsequent frames that includes the logo (block 450) and modifying the luminance map based on the changes in luminance values (block 460). For example, after capturing the initial frame, a set of subsequent frames of the program may be provided for display via the first window. In some implementations, the set of subsequent frames may include a particular number (e.g., 1, 10, 50, 100, etc.) of subsequent frames and/or a number of frames provided for display during a particular period of time. For example, the user may provide information indicating a particular quantity of time for processing the program (e.g., the first 30 seconds of the program, the last 5 minutes of the program, 1 minute, 5 minutes, etc.). Computing device 240 may receive the information and may process each frame of the program that is displayed via the first window during the particular period of time.

In some implementations, computing device 240 may process the set of subsequent frames to determine changes in luminance values for pixels included in an area that includes the logo in each subsequent frame as the subsequent frame is displayed in the first window. For example, as each subsequent frame is displayed, computing device 240 may identify an area of the subsequent frame corresponding to the area of the initial frame that includes the logo. Computing device 240 may determine a change in the luminance value for each pixel included in the identified area based on the luminance map.

In some implementations, for each pixel included in the identified area of the subsequent frame, computing device 240 may determine a luminance value of the pixel in the subsequent frame and a value for the pixel in the luminance map. Computing device 240 may compare the determined luminance values with corresponding values from the luminance map to determine a change in luminance value for each pixel included in the area that includes the logo in the initial frame.

In some implementations, computing device 240 may modify the luminance map when the change in the luminance value indicates that the luminance of the pixel has decreased relative to a previous frame of the program. For example, based on the luminance map, computing device 240 may determine that a luminance value of a pixel in the initial frame is greater than a luminance value of the pixel in the subsequent frame. Computing device 240 may determine that the luminance value of the pixel has decreased and may modify the luminance map based on the luminance value of the pixel decreasing.

In some implementations, computing device 240 may determine a decreased luminance value for the pixel and may modify the luminance map based on the decreased luminance value. In some implementations, the decreased luminance value may correspond to an amount that the luminance value has decreased. In some implementations, the decreased luminance value may be the luminance value of the pixel in the subsequent frame. In some implementations, the decreased luminance value may be a minimum and/or lowest luminance value (e.g., 0). For example, computing device 240 may determine that the luminance value of the pixel in the subsequent frame is less than a threshold luminance value and/or that the change in the luminance value for the pixel is greater than a threshold change in luminance value. Computing device 240 may determine that the pixel is not included within the image of the logo (e.g., luminance has not been added to the pixel) based on the luminance value of the subsequent frame being lower than the threshold luminance value and/or the change in the luminance value being greater than the threshold change in luminance value. Computing device 240 may determine a decreased luminance value for the pixel as the lowest luminance value.

In some implementations, computing device 240 may modify the threshold luminance value and/or the threshold change in luminance value. For example, computing device 240 may determine that a particular percentage of pixels included in the area that includes the logo have changes in luminance values that are less than the threshold change in luminance value. Computing device 240 may reduce the threshold change in luminance value to increase a number of pixels that can be determined to not be considered part of the logo (e.g., increase a number of pixels having a change in luminance value that is greater than the threshold change in luminance value). In some implementations, computing device 240 may periodically evaluate and/or modify the threshold change in luminance value. For example, after processing each subsequent frame, included in the set of subsequent frames and/or modifying the luminance map based on processing the subsequent frame, computing device 240 may analyze the luminance map to determine a percentage of pixels having a luminance value set to the lowest luminance value. Based on the determined percentage, computing device 240 may determine to reduce the threshold change in luminance value used to process a next subsequent frame.

In some implementations, computing device 240 may modify the luminance map after processing each subsequent frame included in the set of subsequent frames. For example, for a particular subsequent frame, computing device 240 may determine a decreased luminance value for one or more pixels having a decreased luminance value relative to a frame processed immediately prior to the particular subsequent frame (e.g., the initial frame or another subsequent frame). In some implementations, computing device 240 may modify the matrix generated for the area that includes the logo. For example, computing device 240 may set a corresponding element of the matrix to the decreased luminance value and/or may set a corresponding pixel in the image to the decreased luminance value prior to processing a next subsequent frame. In some implementations, computing device 240 may modify the image generated for the area that includes the logo. For example, computing device 240 may generate an image based on the values stored in the elements of the modified matrix.

In some implementations, based on processing the last subsequent frame included in the set of subsequent frames, computing device 240 may generate a final luminance map. In some implementations, the final luminance map may include an image corresponding to the area that includes the logo in the program. The luminance map may include a first set of pixels set corresponding to pixels that are outside of the logo in the program and a second set of pixels corresponding to pixels located inside of the logo.

In some implementations, the first set of pixels may have a minimum and/or a lowest luminance value and/or be within a lowest range of luminance values. For example, for a range of luminance values between 0 and 250, with a luminance value of 0 corresponding to black and a luminance value of 250 corresponding to white, each pixel, in the first set of pixels may have a luminance value of 0.

In some implementations, the second set of pixels may have a luminance value and/or be within a range of luminance values that correspond to the luminance added to the program by the content provider. For example, for each frame of the program content, the content provider may increase a luminance value of a group of pixels defining a shape of the logo. A luminance value of each pixel included in the group of pixels may be increased. In some implementations, the amount the luminance value of each pixel is increased may be the same. For example, the luminance value of each pixel may be increased by a particular amount (e.g., 50).

In some implementations, an amount the luminance value of one or more pixels, included in the group of pixels, may be different from an amount the luminance value of one or more other, different pixels, included in the group of pixels is increased. For example, for each pixel included in the group of pixels, the content provider may randomly select an amount from a range of amounts and may increase the luminance value of the pixel by the randomly selected amount.

Process 400 may include storing the luminance map (block 470). For example, computing device 240 may store the final luminance map in a memory associated with computing device 240. The final luminance map may be stored in association with information identifying the threshold change in luminance value and/or other properties of the luminance map (e.g., a required percentage of pixels along an edge of the logo for determining that a program includes the logo, a standard deviation allowed in a range of percentages, etc.), information identifying the location and/or other properties of the logo within a frame (e.g., readable text that a logo creates, an amount of time that a logo is displayed, etc.), and/or information identifying the program, the content provider associated with the program (e.g., a television network providing the program), and/or a particular channel (e.g., a channel associated with the television network providing the program). In some implementations, computing device 240 may associate, in a data structure, the luminance map with the information identifying the threshold change in luminance value and/or the other properties of the luminance map, the information identifying the location and/or other properties of the logo within the frame, and/or the information identifying the program, the content provider, and/or the particular channel. For example, computing device 240 may store information identifying the program and/or information identifying a storage location of the luminance map in a memory associated with service provider 230. In some implementations, when providing the program to set top box 210, service provider 230 may access the data structure to determine the storage location for the luminance map. Service provider 230 may insert the information identifying the storage location into a header portion of a video stream used to provide the program to set top box 210.

In some implementations, computing device 240 may provide the luminance map to set top box 210. Set top box 210 may store the luminance map in a memory of set top box 210. Set top box 210 may associate, in a data structure, the luminance map with the information identifying the threshold change in luminance value and/or the other properties of the luminance map, the information identifying the location and/or other properties of the logo within the frame, and/or the information identifying the program, the content provider, and/or the particular channel. Also, while process 400 is described in terms of a program, process 400 could be performed for multiple programs (e.g., all programs) and/or multiple luminance maps and logos (e.g., all luminance maps used to identify all logos in a program), and/or multiple channels (e.g., all channels) associated with service provider 230 and/or set top box 210. For example, a program may include multiple variations of a logo, one or more solid logos, and/or one or more transparent logos and process 400 may be performed for each of the multiple variations of the logo, each of the one or more solid logos, and/or each of the one or more transparent logos.

While FIG. 4 shows process 400 as including a particular quantity and arrangement of blocks, in some implementations, process 400 may include fewer blocks, additional blocks, different blocks, or a different arrangement of blocks. Additionally, or alternatively, some or all of the blocks may be performed in parallel. For example, multiple logos may be present within a program and multiple instances of process 400 may be performed in parallel.

Figure 5A:
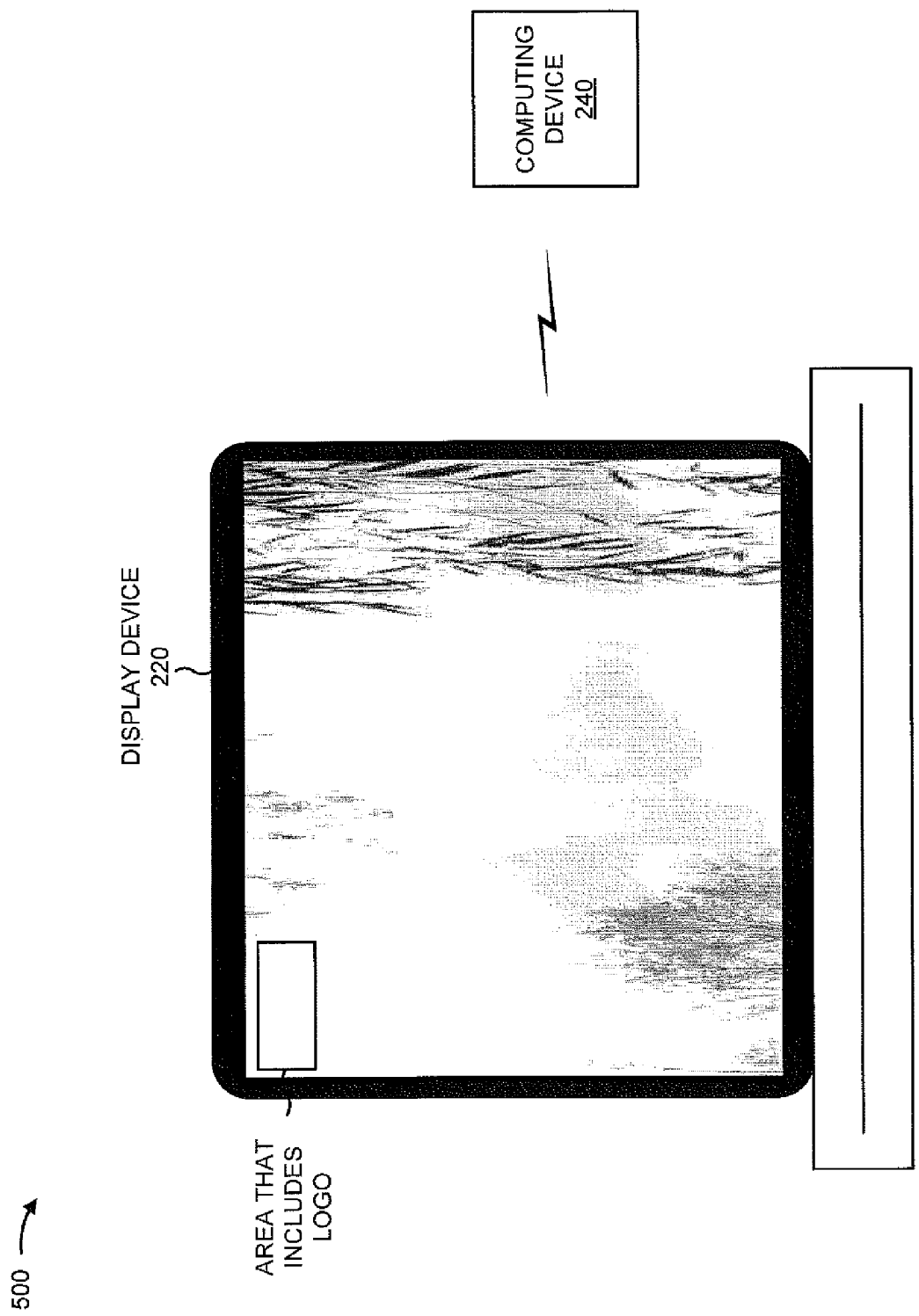

FIGS. 5A-5F are diagrams of an example 500 of process 400 described in connection with FIG. 4. For example 500, assume that a content provider inserts an image of a logo into a program and that computing device 240 obtains the program from the content provider and provides an initial frame of the program for display via display device 220. Further, assume that a user highlights an area around the logo. Referring now to FIG. 5A, computing device 240 may identify an area that includes the logo based on the user highlighting the area around the logo and may determine a set of pixels included in the identified area.

Figure 5B:
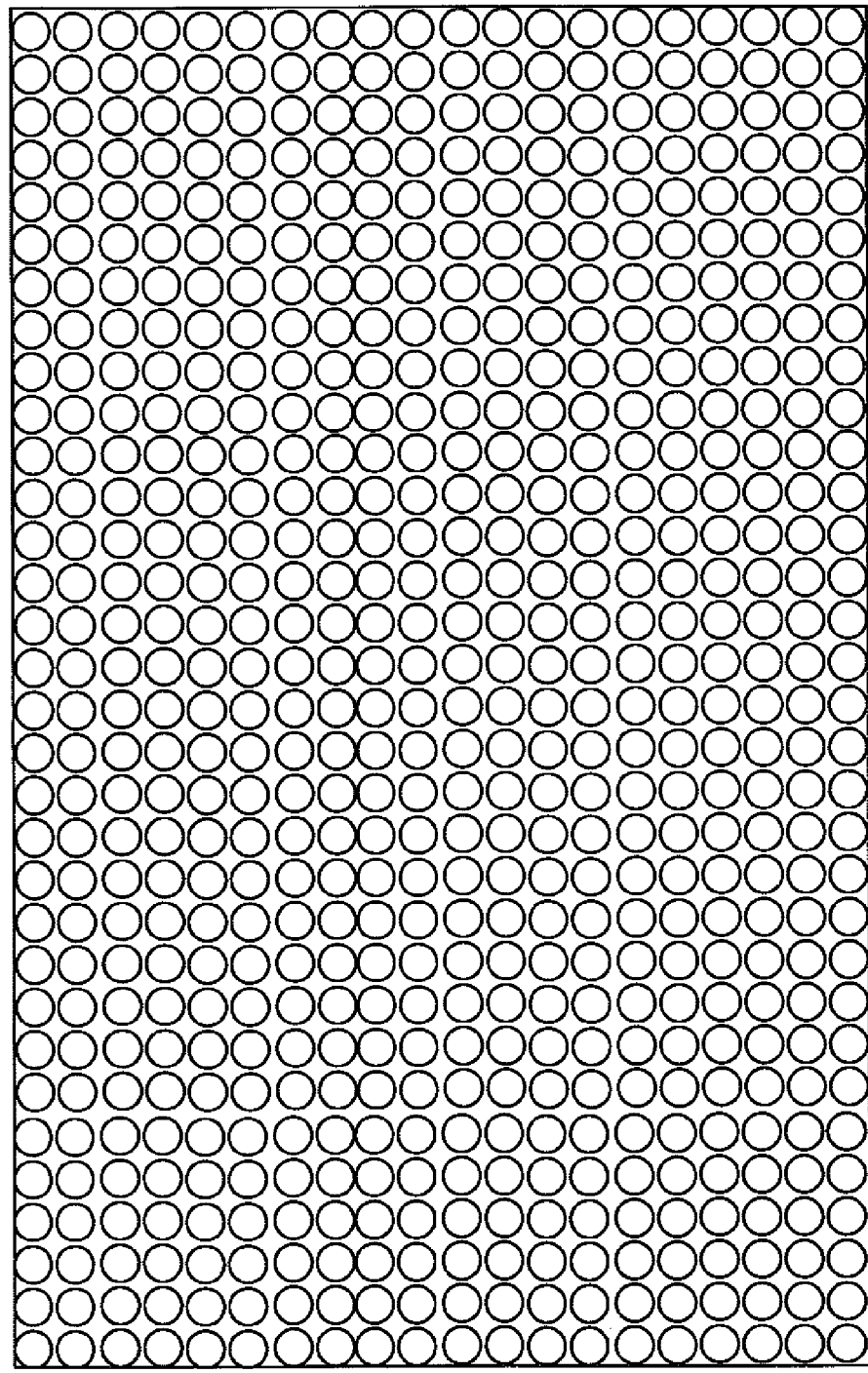

For FIG. 5B, assume that computing device 240 determines luminance values for the set of pixels included in the identified area and generates a luminance map based on the determined luminance values. Referring now to FIG. 5B, the luminance map may show a contrast in brightness between pixels included in the set of pixels. As shown in FIG. 5B, because the logo is displayed over a bright image in the initial frame, the logo is not visibly distinguishable in the luminance map.

Referring to FIG. 5C, computing device 240 may cause a first subsequent frame of the program to be displayed via display device 220. Computing device 240 may identify an area in the first subsequent frame that corresponds to the area of the initial frame that includes the logo (shown in FIG. 5C within the box formed by the dotted lines).

Figure 5D:
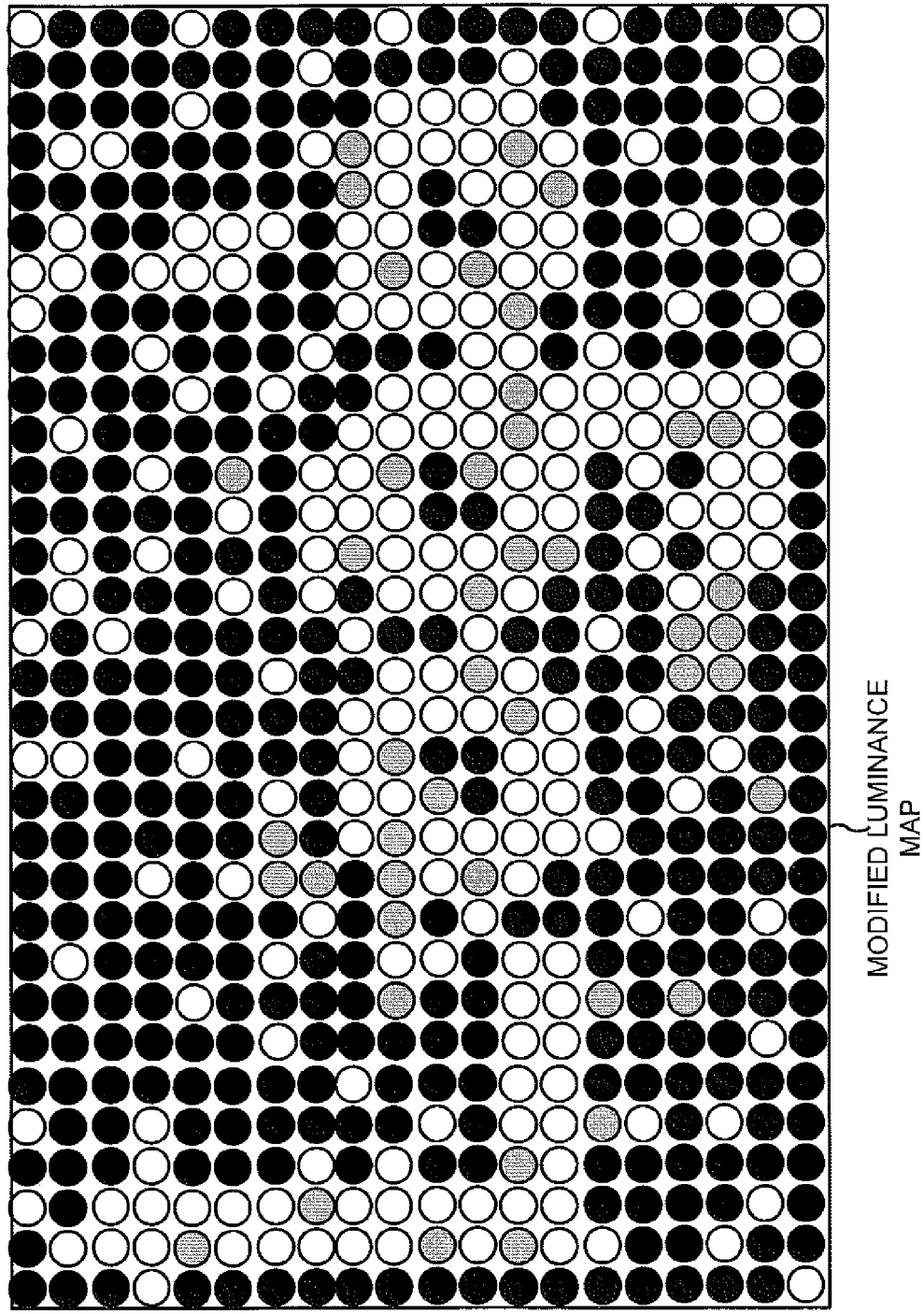

Referring now to FIG. 5D, computing device 240 may determine changes in luminance values for the set of pixels included in the corresponding area and may modify the luminance map based on the determined changes in luminance values. As shown in FIG. 5D, the luminance map includes a group of pixels set to a lowest luminance value (shown in FIG. 5D as black pixels), a group of pixels set to a value corresponding to a change in luminance value determined for each of the pixels (shown in FIG. 5D as gray pixels), and a group of pixels whose luminance values remain unchanged (shown in FIG. 5D as white pixels).

Referring to FIG. 5E, computing device 240 may cause a second subsequent frame to be displayed via display device 220. Computing device 240 may identify an area in the second subsequent frame that corresponds to the area of the initial frame that includes the logo (shown in FIG. 5E within the box formed by the dotted lines).

Figure 5F:
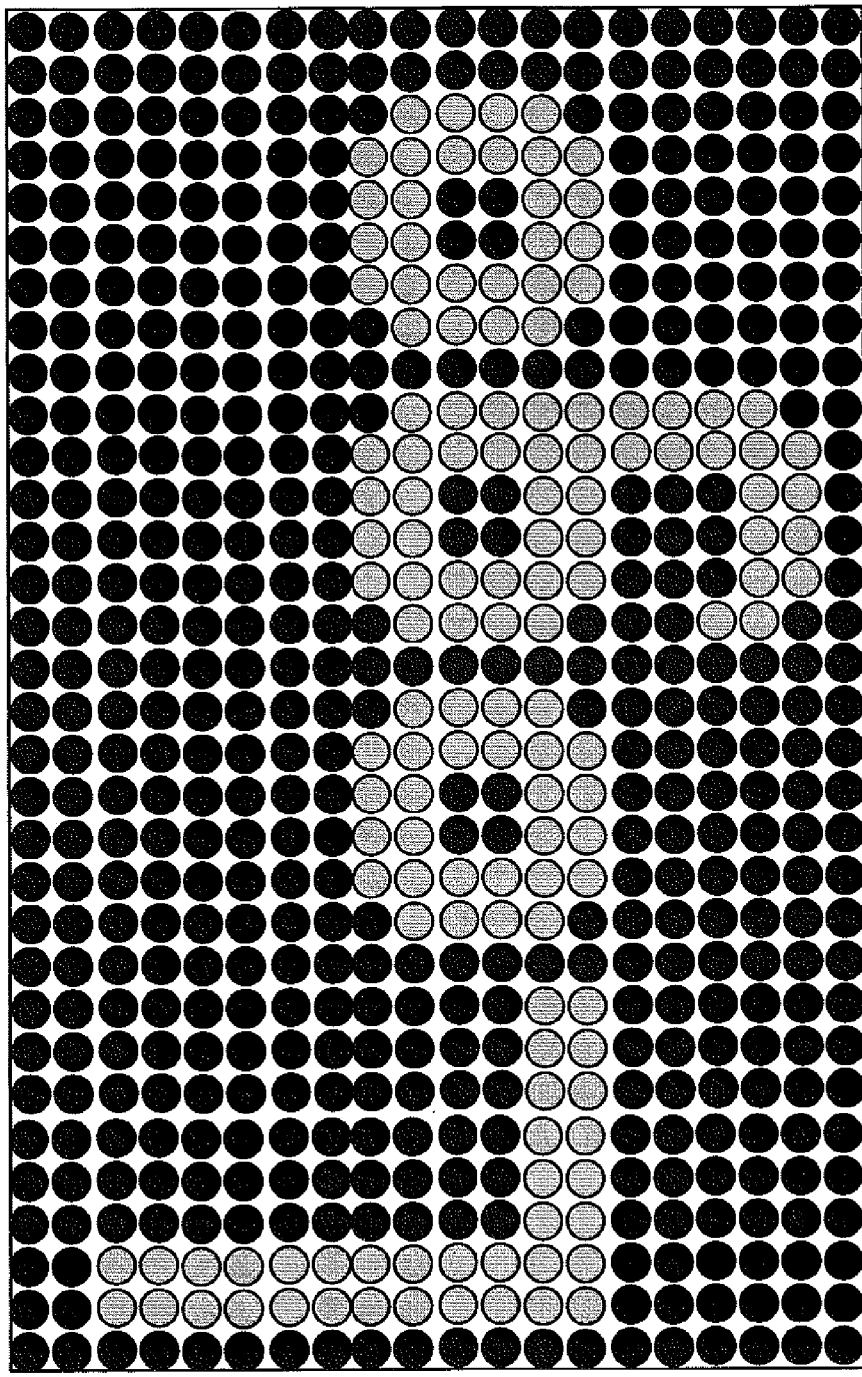

Referring now to FIG. 5F, computing device 240 may determine changes in luminance values for the set of pixels included in the corresponding area and may modify the luminance map based on the determined changes in luminance values. As shown in FIG. 5F, the luminance map includes a group of pixels set to a lowest luminance value (shown in FIG. 5F as black pixels) and a group of pixels set to a value corresponding to a change in luminance value determined for each of the pixels (shown in FIG. 5F as gray pixels). Computing device 240 may determine that a particular percentage of the set of pixels are set to the lowest luminance value and may determine not to process any more subsequent frames of the program. Computing device 240 may store the luminance map in a memory of computing device 240.

As indicated above, FIGS. 5A-5F are provided merely as an example. Other examples are possible and may differ from what was described with regard to FIGS. 5A-5F.

Figure 6:
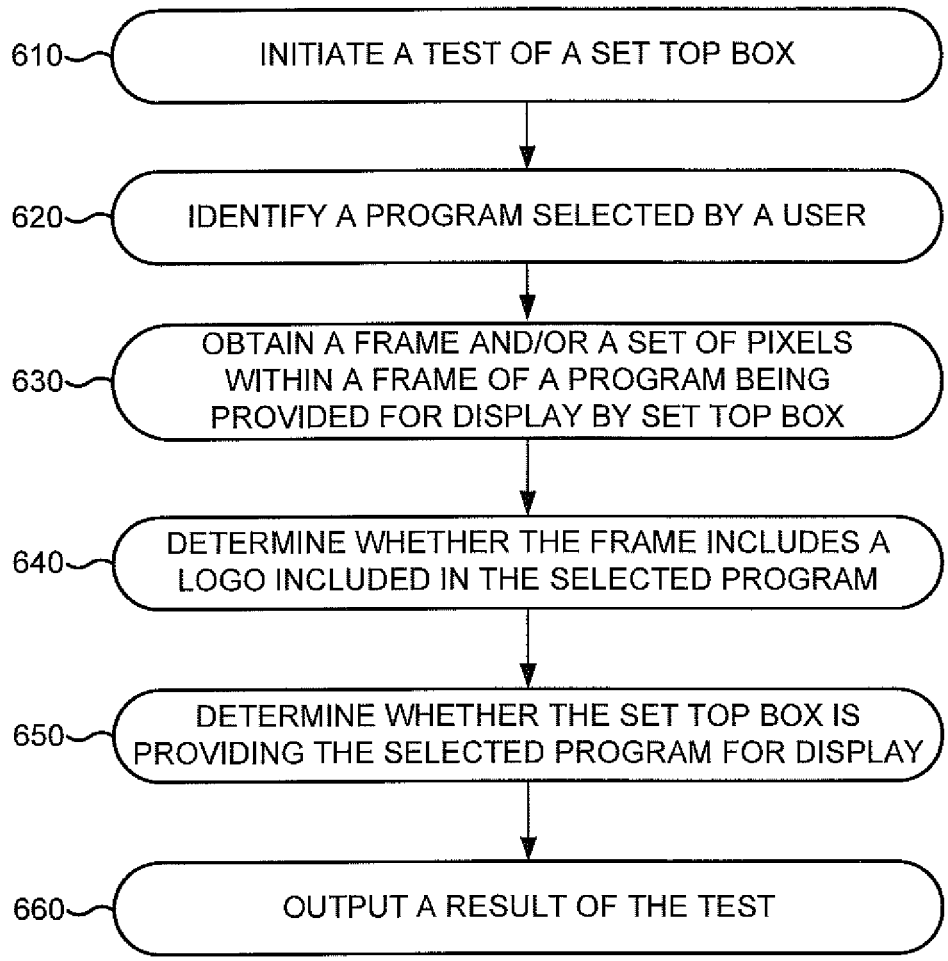
FIG. 6 is a flow chart of an example process for verifying a program being provided for display by a set top box.

FIG. 6 is a flow chart of an example process 600 for verifying a program being provided for display by a set top box. In some implementations, process 600 may be performed by computing device 240. In some implementations, one or more blocks of process 600 may be performed by one or more devices instead of, or possibly in conjunction with, computing device 240.

As shown in FIG. 6, process 600 may begin with initiating a test of a set top box (block 610). For example, computing device 240 may send a message to set top box 210. Set top box 210 may receive the message and may initiate a test for determining whether set top box 210 is operating correctly (e.g., providing the correct program for display to a user).

Additionally, or alternatively, set top box 210 may initiate the test based on other criteria. For example, the test may be initiated periodically (e.g., daily, weekly, monthly, etc.). In some implementations, the test may be initiated in response to a user selecting a program. For example, each time the user accesses an electronic program guide provided by set top box 210 and/or selects a program, set top box 210 may initiate a test for verifying that the selected program is actually being provided for display to the user. In some implementations, the test may be initiated each time set top box 210 is tuned to a particular channel and/or set to a particular frequency. For example, the test may be initiated each time set top box 210 is tuned to a channel associated with a television network for a particular amount of time.

Process 600 may include identifying a program selected by a user (block 620). For example, set top box 210 may provide a list of programs to a user (e.g., in response to a command from the user) via display device 220 and the user may select one of the listed programs using, for example, a remote control. Set top box 210 may identify the program based on the selection. Set top box 210 may determine a channel associated with the selection and/or the selected program and may provide a program transmitted via the determined channel to display device 220 for display to the user.

In some implementations, set top box 210 may send information identifying the selected program to computing device 240. For example, set top box 210 may send, to computing device 240, information identifying a channel to which set top box 210 is set, information identifying a frequency to which set top box 210 is tuned, information identifying a channel number input by the user (e.g., using a remote control), information identifying the selected program (e.g., a title of the selected program), electronic program guide information regarding the selection by the user, an information page associated with the selected program, and/or another type of information useful for identifying the selected program. Computing device 240 may receive the information and may identify the selected program based on the information.

Process 600 may include obtaining a frame and/or a set of pixels within a frame of a program being provided for display by the set top box (block 630). For example, set top box 210 may be providing a program to display device 220. Display device 220 may receive the program from set top box 210 and may provide the program for display to the user. Set top box 210 may capture a frame and/or a set of pixels within a frame of a program being displayed via display device 220.

In some implementations, set top box 210 may capture the frame and/or the set of pixels within the frame of the program in response to a signal received from computing device 240. For example, computing device 240 may obtain a luminance map for the program and, in response to obtaining the luminance map, computing device 240 may send an instruction for capturing a frame and/or a set of pixels within a frame of a program to set top box 210. Set top box 210 may receive the signal and may capture a frame and/or a set of pixels within a frame currently being provided for display via display device 220. Set top box 210 may send the captured frame and/or the set of pixels within the captured frame to computing device 240 in response to the instruction.

In some implementations, set top box 210 may capture a single frame and/or a single set of pixels of a single frame. In some implementations, set top box 210 may capture a set of frames and/or multiple sets of pixels within each frame of a set of frames. For example, the program may include multiple regions of interest (e.g., multiple logos inserted in multiple locations of a frame) and/or multiple luminance maps may be generated for the program. The instruction may identify a quantity of frames and/or sets of pixels and set top box 210 may capture the quantity of frames and/or the sets of pixels as the frames are displayed by display device 220. Set top box 210 may send the quantity of frames and/or the sets of pixels to computing device 240.

Process 600 may include determining whether the frame includes a logo included in the selected program (block 640). For example, computing device 240 may obtain a luminance map associated with the program selected by the user. In some implementations, computing device 240 may access information (e.g., a data structure) identifying a storage location in a memory of luminance maps associated with a group of programs. Computing device 240 may determine a storage location of a luminance map associated with the program selected by the user and may obtain the luminance map from the memory.

In some implementations, the luminance map may be associated with a particular channel and/or a particular content provider. For example, computing device 240 may determine that the selected program is provided by a particular television network. Computing device 240 may obtain a luminance map of a logo of the particular television network. Computing device 240 may determine whether the frame includes the logo based on the luminance map.

In some implementations, the luminance map may identify an amount of luminance added to a set of pixels included in the selected program. For example, the particular television network associated with the selected program may add luminance to a set of pixels to cause a transparent image of a logo of the television to be displayed over the program when the program is viewed by the user. The luminance map may identify an amount of luminance added to each pixel, of the set of pixels. Computing device 240 may determine whether the frame includes a corresponding set of pixels having the added luminance.

In some implementations, computing device 240 may identify the corresponding set of pixels within the frame obtained from set top box 210 based on information regarding a location of the set of pixels having added luminance included in the luminance map. For example, the luminance map may identify addresses of particular addressable elements of display device 220 associated with the set of pixels. Computing device 240 may identify a set of pixels, included in the frame obtained from set top box 210, associated with the particular addressable elements of display device 220 based on the addresses.

In some implementations, computing device 240 may determine luminance values for the corresponding set of pixels and may determine whether the frame includes the logo based on the luminance values. In some implementations, computing device 240 may identify, based on the luminance map, locations of pixels along an edge of the logo.

For example, the luminance map may include a first set of pixels that are included within the logo and a second set of pixels that are outside of the logo. The second set of pixels may be set to a lowest luminance value and the first set of pixels may be set to a value other than the lowest luminance value (e.g., a luminance value corresponding to the amount of added luminance). Computing device 240 may identify a group of pixels that are set to a value other than the lowest luminance value and are adjacent to one or more other pixels that are set to the lowest luminance value. Computing device 240 may determine that the group of elements are located along an edge of the logo. Computing device 240 may identify a corresponding group of elements in the frame (e.g., based on the addresses included in the luminance map) and may determine whether the corresponding group of elements have the added luminance.

In some implementations, computing device 240 may compare the luminance values of the corresponding group of pixels with adjacent pixels included in the frame to determine whether the logo is included the frame. For example, based on the luminance map, computing device 240 may determine an address associated with a first pixel located along the edge of the logo (e.g., a third row and a fourth column) and/or an address of an addressable element associated with each adjacent pixel set to the lowest luminance value (e.g., the third row and a fifth column, a fourth row and the fourth column, and the fourth row and the fifth column). Computing device 240 may identify luminance values for corresponding pixels in the frame obtained from set top box 210 (e.g., pixels associated with addressable elements located in a third row and a fourth column, the third row and a fifth column, a fourth row and the fourth column, and the fourth row and the fifth column). Computing device 240 may determine whether a luminance value of a pixel corresponding to the first pixel (e.g., the pixel in the frame associated with the addressable element located in the third row and the fourth column) is greater than the luminance values of the one or more other pixels (e.g., the pixels associated with the addressable elements located in the third row and the fifth column, the fourth row and the fourth column, and the fourth row and the fifth column) by an amount corresponding to the value of the first pixel. Computing device 240 may determine that the frame includes the first pixel (e.g., a pixel along the edge of the logo) when the luminance value of the pixel corresponding to the first pixel is greater than the luminance values of the one or more other pixels by the value of the first pixel.

In some implementations, computing device 240 may determine that the luminance value of the pixel corresponding to the first pixel is not greater than the luminance values of the one or more other pixels. For example, when inserting the logo into the program, the particular television network may cause the location of the logo to vary from frame to frame to prevent the logo from easily being removed from the program. Computing device 240 may determine that the luminance value of the pixel corresponding to the first pixel is the same as the luminance values of one or more other pixels. Computing device 240 may analyze the luminance values of one or more pixels positioned around the pixel corresponding to the first pixel to determine whether the first pixel is included in the frame. In some implementations, computing device 240 may examine a 9×9 array of pixels located around the pixel corresponding to the first pixel. In some implementations, computing device 240 may examine a smaller or a larger array of pixels located around the pixel corresponding to the first pixel. In some implementations, computing device 240 may examine pixels in other locations of the frame. In some implementations, the logo may be inserted into multiple locations of the program and computing device 240 may examine pixels in each of the multiple locations. In some implementations, a location of the logo may change depending on a resolution at which the program is displayed and/or a format of the program (e.g., widescreen, full screen, high definition, etc.). Computing device 240 may examine pixels in other locations of the frame based on the resolution and/or the format of the frame.

In some implementations, computing device 240 may execute block 640 using other luminance maps, such as, for example, another version of the luminance map generated for the logo. For example, computing device 240 may obtain a luminance map generated for the logo using a different threshold change in luminance value, a luminance map provided by a network vendor or advertisement producer/distributor (e.g., to determine whether a particular commercial is being provided for display during a particular program and/or to account for the logo not being included in a commercial provided during the program), etc.

In some implementations, computing device 240 may determine whether each pixel along the edge of the logo is included in the frame. Computing device 240 may determine that the logo is included in the frame when a particular percentage of the pixels along the edge of the logo are included in the frame.

In some implementations, computing device 240 may not be able to determine whether the logo is included in the frame. For example, the frame may depict a bright scene (e.g., an image of a cloud on a bright, sunny day) and the luminance values of the pixels in the frame may be relatively high luminance values and/or within a range of values that is less than an amount of luminance added to the set of pixels. Computing device 240 may determine that the luminance values for the pixels included in the frame are too high for determining whether the logo is included in the frame and may obtain another frame of the program being provided for display from set top box 210.

In some implementations, computing device 240 may obtain a set of frames from set top box 210 and may determine whether the logo is included in a particular percentage of the set of frames. For example, computing device 240 may identify a corresponding set of pixels in each frame included in the set of frames. Computing device 240 may determine that the logo is included in the set of frames when a particular percentage of the corresponding sets of pixels have the added luminance.

Process 600 may include determining whether the set top box is providing the selected program for display (block 650) and outputting a result of the test (block 660). For example, computing device 240 may determine whether the set top box is providing the selected program for display to the user based on whether the frame includes the logo. In some implementations, the frame may include the logo and computing device 240 may output a result indicating that set top box 210 is operating correctly and/or that set top box is providing the selected program for display to the user. For example, computing device 240 may send a message to set top box 210 indicating that set top box is providing the correct program for display to the user. Set top box 210 may receive the message and may store information indicating that the test was performed (e.g., a time and/or date the test was performed) and/or that a result of the test indicated that set top box 210 was providing the correct program for display to the user in a data structure storing diagnostic and/or testing information associated with set top box 210.

In some implementations, the frame may not include the logo and computing device 240 may output a result indicating that set top box 210 is not operating properly. For example, computing device 210 may send an error message to set top box 210 and/or a technician indicating that set top box 210 is providing the wrong program for display to the user, that set top box 210 is tuned to a wrong channel, that a content server is improperly configured (e.g., set to a wrong time zone), etc.

In some implementations, computing device 240 may determine that set top box 210 is not providing any program for display to the user. For example, the luminance values for pixels included in the frame obtained from set top box 210 may all correspond to black (e.g., a lowest luminance value). Computing device 240 may determine that set top box 210 is not operating correctly and may output an error message indicating that set top box 210 is not providing any program for display to the user.

While FIG. 6 shows process 600 as including a particular quantity and arrangement of blocks, in some implementations, process 600 may include fewer blocks, additional blocks, or a different arrangement of blocks. Additionally, or alternatively, some or all of the blocks may be performed in parallel. For example, multiple logos may be present within a program and/or multiple programs may be being provided for display via separate tuners included in set top box 210 and multiple instances of process 600 may be performed in parallel.

Figure 7A:
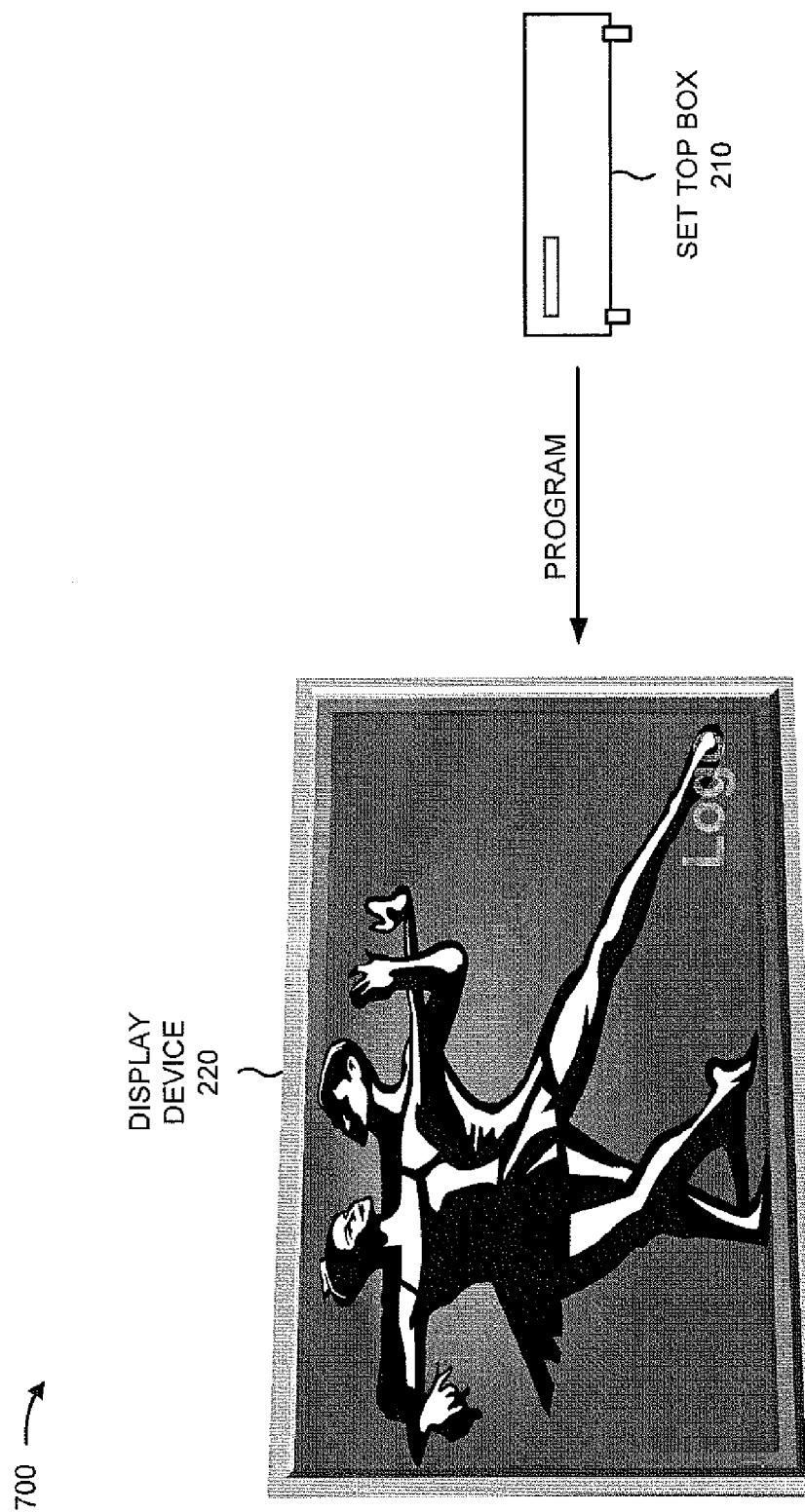
Figure 7C:
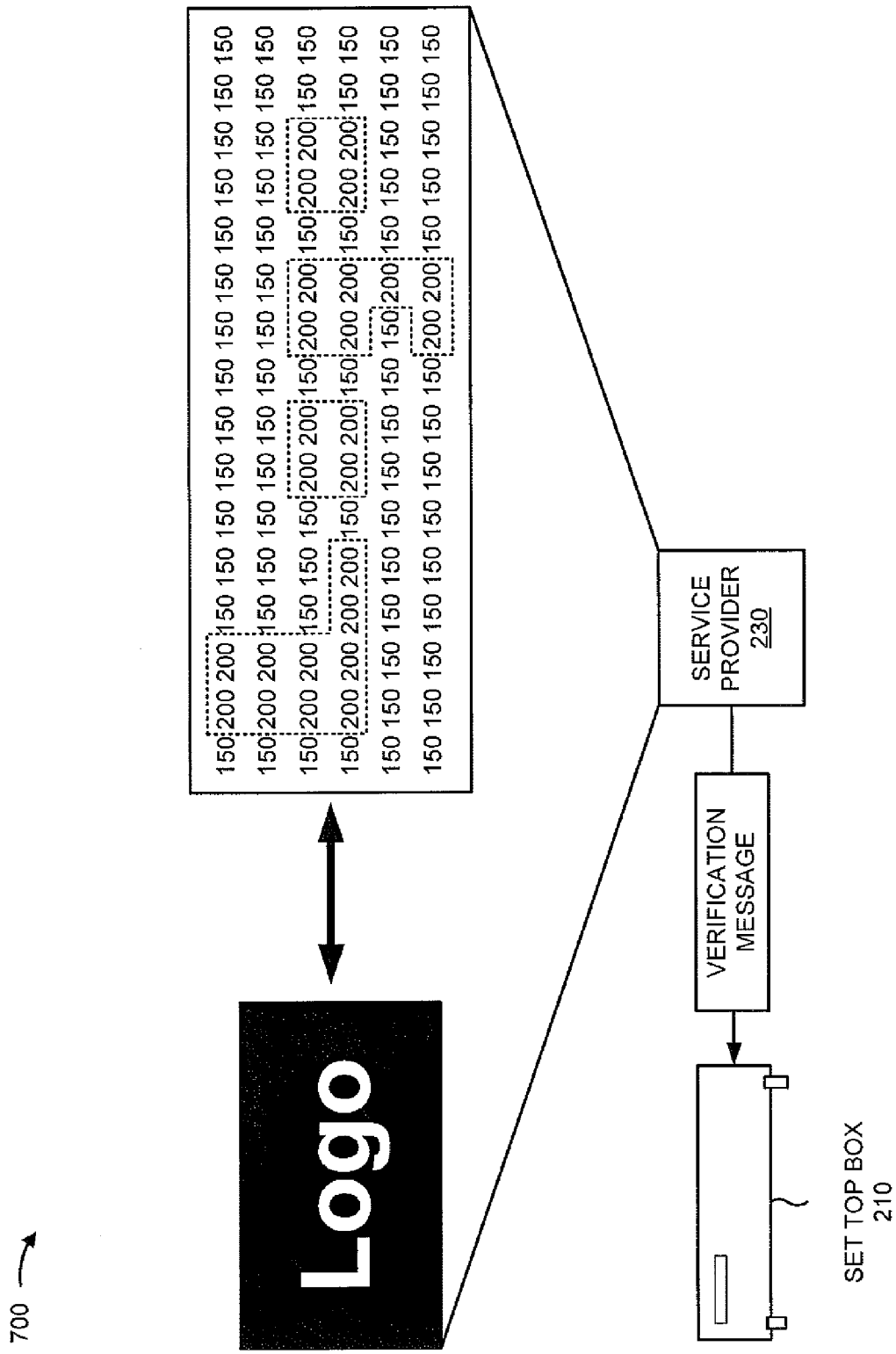

FIGS. 7A-7C are diagrams of an example 700 of process 600 described in connection with FIG. 6. For example 700, assume that set top box 210 receives a program from a content provider and that the content provider has inserted an image of a logo into the program by increasing a luminance value of a set of pixels defining a shape of the logo. Further, assume that a user has accessed an electronic program guide provided by set top box 210 and has selected the program via the electronic program guide. Further, assume that, in response to the selection of the program, set top box 210 is set to a particular channel and receives the program via the particular channel. Referring now to FIG. 7A, set top box 210 may receive the program and may provide the program to display device 220 for display to the user.

Referring now to FIG. 7B, to verify that the program is being provided for display to the user, service provider 230 may obtain a luminance map for the program and obtain luminance values for pixels included in a frame of the program from set top box 210.

For FIG. 7C, assume that the luminance map indicates that the image logo was inserted into the program by increasing the luminance value of the set of pixels included within the image of the logo by 50. Referring to FIG. 7C, based on the luminance map, service provider 230 may determine a location at which a set of pixels having the increased luminance value should be located within the frame of the program. Service provider 230 may analyze the luminance values of corresponding pixels included in the frame of the program to determine whether the set of pixels having the added luminance are included in the frame of the program. As shown in FIG. 7C, service provider 230 determines that the set of pixels having the added luminance are included in the frame of the program. Service provider 230 sends a verification message to set top box 210. The verification message may indicate that set top box 210 is correctly providing the program for display to the user.

As indicated above, FIGS. 7A-7C are provided merely as an example. Other examples are possible and may differ from what was described with regard to FIGS. 7A-7C. Although example 700 is described in terms of service provider 230, example 700 could be performed by another device, such as, for example, set top box 210.

The foregoing description provides illustration and description, but is not intended to be exhaustive or to limit the embodiments to the precise form disclosed. Modifications and variations are possible in light of the above teachings or may be acquired from practice of the implementations. For example, while the above description focused on providing information regarding a luminance map of a logo to a set top box, implementations, described herein, are equally applicable to providing information regarding a luminance map of other types of images to devices other than a set top box.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
   obtaining, by a device, a program that includes a logo in an initial frame of the program,
      the logo being inserted into the program by adding luminance to a set of pixels defining a shape of the logo;
   generating, by the device, a luminance map for the program, the luminance map identifying an amount of luminance added to each pixel, included in the set of pixels, to insert the logo into the program, and
generating the luminance map including:
processing a set of subsequent frames of the program;
determining a change in luminance value for one or more pixels, of a group of pixels included in an area associated with the initial frame, based on processing the set of subsequent frames and based on determining that a luminance value for the one or more pixels in a subsequent frame, of the set of subsequent frames, is less than a luminance value of the one or more pixels associated with the initial frame, and
generating the luminance map based on the determined change in the luminance value for the one or more pixels;
determining, by the device, a selection of the program via a set top box associated with a user; and
determining, by the device, that the set top box is providing the program for display to the user based on the luminance map.

2. The method of claim 1, where generating the luminance map includes:
capturing the initial frame;
determining an area that includes the logo; and
determining luminance values for the group of pixels.

3. The method of claim 1, where determining the change in luminance value for the one or more pixels includes:
determining that the change in luminance value for the one or more pixels is greater than a threshold change in luminance value,
where generating the luminance map includes:
setting the luminance value of the one or more pixels to a lowest luminance value; and
generating the luminance map based on setting the luminance value of the one or more pixels to the lowest luminance value.

4. The method of claim 1, where determining the selection of the program includes:
obtaining diagnostic information from the set top box associated with the user;
determining, based on the diagnostic information, that the set top box is one or more of:
set to a particular channel, or
tuned to a particular frequency; and
determining the selection of the program based on the set top box being one or more of set to the particular channel or tuned to the particular frequency.

5. The method of claim 1, where determining that the set top box is providing the program for display to the user includes:
determining, based on the luminance map, a pixel included along an edge of the logo; and
determining whether the program includes the pixel included along the edge of the logo.

6. The method of claim 5, where determining whether the program includes the pixel included along the edge of the logo includes:
determining, based on the luminance map, that the pixel, included along the edge of the logo, has a luminance value that is greater than a lowest luminance value and is adjacent to one or more pixels associated with the lowest luminance value.

7. A device comprising:
a processor to:
generate a luminance map for a program,
the program including a set of pixels having added luminance,
the set of pixels defining a shape of a logo,
the logo being in an initial frame of the program,
the luminance map identifying an amount of luminance corresponding to the added luminance included in the set of pixels, and
the processor, when generating the luminance map, being to:
process a set of subsequent frames of the program;
determine a change in luminance value for one or more pixels, of a group of pixels included in an area associated with the initial frame, based on processing the set of subsequent frames and based on determining that a luminance value for the one or more pixels in a subsequent frame, of the set of subsequent frames, is less than a luminance value of the one or more pixels associated with the initial frame, and
generate the luminance map based on the determined change in the luminance value for the one or more pixels;
determine that the program has been selected for display via the display device; and
determine whether the program is being provided for display via the display device using the luminance map.

8. The device of claim 7, where, when generating the luminance map, the processor is to:
capture the initial frame; and
determine luminance values for the group of pixels.

9. The device of claim 7, where, when determining the change in luminance value for the one or more pixels, the processor is to:
determine that the change in luminance value for the one or more pixels is greater than a threshold change in luminance value,
where, when generating the luminance map, the processor is to:
set the luminance value of the one or more pixels to a luminance value corresponding to black; and
generate the luminance map based on setting the luminance value of the one or more pixels to the luminance value corresponding to black.

10. The device of claim 7, where, when determining whether the program is being provided for display, the processor is to:
determine, using the luminance map, whether the program being provided for display includes a set of pixels having the added luminance.

11. The device of claim 10, where, when determining whether the program being provided for display includes the set of pixels having the added luminance, the processor is to:
determine, based on the luminance map, a pixel included along an edge of the logo; and
determine that a frame of the program being provided for display includes the pixel included along the edge of the logo.

12. The device of claim 11, where, when determining that the frame of the program being provided for display includes the pixel included along the edge of the logo, the processor is to:
determine, based on the luminance map, that the pixel included along the edge of the logo is:
associated with a luminance value that is greater than a lowest luminance value, and adjacent to one or more pixels associated with the lowest luminance value.

13. A non-transitory computer-readable medium storing instructions, the instructions comprising:
one or more instructions that, when executed by a processor, cause the processor to:
generate a luminance map for a program,
the program including a set of pixels having added luminance,
the set of pixels defining a shape of a logo,
the logo being in a first frame of the program,
the luminance map identifying an amount of luminance corresponding to the added luminance included in the set of pixels, and
the one or more instructions to generate the luminance map including:
one or more instructions to process a set of second frames of the program;
one or more instructions to determine a change in luminance value for one or more pixels, of a group of pixels included in an area associated with the first frame, based on processing the set of second frames and based on determining that a luminance value for the one or more pixels in a second frame, of the set of second frames, is less than a luminance value of the one or more pixels associated with the first frame, and
one or more instructions to generate the luminance map based on the determined change in the luminance value for the one or more pixels;
determine that the program has been selected for display via the display device; and
determine whether the program is being provided for display using the luminance map.

14. The non-transitory computer-readable medium of claim 13, where the one or more instructions to generate the luminance map further cause the processor to:
capture the first frame; and
determine luminance values for the group of pixels.

15. The non-transitory computer-readable medium of claim 14, where the one or more instructions to determine the change in luminance value for the one or more pixels further cause the processor to:
determine that the change in luminance value for the one or more pixels is greater than a threshold change in luminance value,
where the one or more instructions to generate the luminance map further cause the processor to:
set the luminance value of the one or more pixels to a luminance value corresponding to black; and
generate the luminance map based on setting the luminance value of the one or more pixels to the luminance value corresponding to black.

16. The non-transitory computer-readable medium of claim 13, where the one or more instructions to determine whether the program is being provided for display further cause the processor to:
determine, using the luminance map, whether the program being provided for display includes a set of pixels having the added luminance.

17. The non-transitory computer-readable medium of claim 16, where the one or more instructions to determine whether the program being provided for display includes the set of pixels having the added luminance further cause the processor to:
determine, based on the luminance map, a pixel included along an edge of the logo; and
determine that a frame of the program being provided for display includes the pixel included along the edge of the logo.

18. The method of claim 1, where the logo is at least partially transparent.

19. The device of claim 7, where the logo is at least partially transparent.

20. The non-transitory computer-readable medium of claim 13, where the logo is at least partially transparent.

* * * * *